Patented Dec. 9, 1924.

1,518,689

UNITED STATES PATENT OFFICE.

JÜRGEN CALLSEN, OF ELBERFELD, GERMANY, ASSIGNOR TO FARBENFABRIKEN VORM. FRIEDR. BAYER AND CO., OF LEVERKUSEN, NEAR COLOGNE-ON-THE-RHINE, GERMANY.

CHOLINE COMPOUND HAVING LAXATIVE PROPERTIES.

No Drawing. Application filed February 14, 1924. Serial No. 692,883.

*To all whom it may concern:*

Be it known that I, JÜRGEN CALLSEN, a citizen of Germany, residing at Elberfeld, State of Prussia, Germany, have invented new and useful Improvements in Choline Compounds Having Laxative Properties, of which the following is a specification.

The present invention relates to the manufacture and production of new choline compounds, such as choline

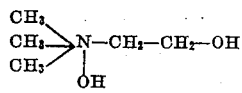

or its derivatives in which the hydrogen atom of the hydroxyethyl group is replaced by a hydroxyalkyl radicle, such as—

The new compounds possess valuable pharmaceutical properties similar to those of the alkaloid arecolin. They are laxatives which can be used for subcutaneous injections.

Their salts, for example the bromides, iodides and nitrates, possess the valuable properties of the bases and are whitish crystalline materials, soluble in water and alcohol, an average subcutaneous dose being about 0.05 gram.

In order to illustrate my new invention more fully, the following example is given, the parts being by weight:—

To 133 parts of dimethylaminoethylglycol

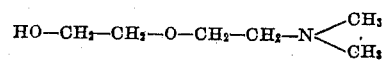

400 parts by weight of a 25 per cent solution of methylbromide in benzene is added taking care to cool. A syrup is obtained which solidifies to a crystalline mass, which is recrystallized from alcohol.

The resulting hydroxyethylethertrimethylammoniumbromide

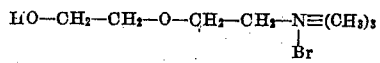

is a whitish crystalline powder easily soluble in water and in alcohol, insoluble in benzene and ether. It melts at 83–86° C. The iodide melts at 116–117° C. The nitrate forms white hygroscopic crystals. The hydroxyethylethermethyldiethylammoniumiodide melts at 117–120° C. The glycerylether of bismethyldiethylhydroxyethylammoniumiodide has most probably the formula:

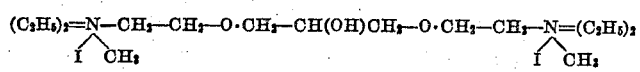

I claim:—

1. As new products, choline compounds in which the hydrogen of the hydroxyethyl group of choline and its derivatives is replaced by a hydroxyalkyl radicle, the salts of said compounds being whitish crystalline materials soluble in water and alcohol and valuable laxatives capable of subcutaneous injection.

2. The herein described hydroxyethylethertrimethylammonium bromide having most probably the formula:

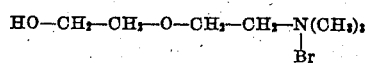

being a white crystalline powder, easily soluble in water and alcohol, insoluble in benzene and ether, melting at 83–86° C. and being a valuable laxative for subcutaneous use, substantially as described.

In testimony whereof I have hereunto set my hand.

JÜRGEN CALLSEN.